(12) United States Patent
Hench et al.

(10) Patent No.: US 9,133,815 B1
(45) Date of Patent: Sep. 15, 2015

(54) PROPELLER-TYPE DOUBLE HELIX TURBINE APPARATUS AND METHOD

(75) Inventors: Steven C. Hench, Annapolis, MD (US); Charles R. Fralick, Ashburn, VA (US)

(73) Assignee: Leidos, Inc., Reston, VA (US)

( * ) Notice: Subject to any disclaimer, the term of this patent is extended or adjusted under 35 U.S.C. 154(b) by 562 days.

(21) Appl. No.: 13/105,485

(22) Filed: May 11, 2011

(51) Int. Cl.
F03B 17/06 (2006.01)

(52) U.S. Cl.
CPC .................................. *F03B 17/061* (2013.01)

(58) Field of Classification Search
CPC ....... F03B 17/06; F03B 17/061; Y02E 10/20; Y02E 10/223; Y02E 10/226; Y02E 10/28
USPC .......... 415/3.1, 906, 908, 71, 72, 75, 2.1, 4.1, 415/4.3, 4.5, 905; 416/176, 84, 85, 86
See application file for complete search history.

(56) References Cited

U.S. PATENT DOCUMENTS

| | | | |
|---|---|---|---|
| 953,891 A * | 4/1910 | Atkins | 416/11 |
| 1,502,511 A | 7/1924 | Marvin | |
| 1,767,995 A * | 6/1930 | McChesney | 416/176 |
| 2,990,803 A | 7/1961 | Henderson | 114/230 |
| 3,001,371 A | 9/1961 | Gilmore, Jr. et al. | 61/48 |
| 3,070,061 A | 12/1962 | Rightmyer | 115/34 |
| 3,231,749 A | 1/1966 | Hink, III | 290/53 |
| 3,654,807 A | 4/1972 | Deskey | 73/180 |
| 3,691,573 A | 9/1972 | Laudato, Jr. | 441/16 |
| 3,763,703 A | 10/1973 | Man | 73/182 |
| 3,800,128 A | 3/1974 | Kurk | 701/21 |
| 3,814,910 A | 6/1974 | Palmieri et al. | 701/21 |
| 3,875,388 A | 4/1975 | Luten et al. | 701/21 |
| 3,881,094 A | 4/1975 | Taylor et al. | 701/21 |
| 3,881,095 A | 4/1975 | Taylor et al. | 701/21 |
| 3,968,353 A | 7/1976 | Kuller | 701/21 |
| 4,110,630 A | 8/1978 | Hendel | 290/53 |

(Continued)

FOREIGN PATENT DOCUMENTS

| | | | |
|---|---|---|---|
| WO | WO 2009018666 A1 * | 2/2009 | |
| WO | WO 2012/016283 | 2/2012 | F03C 2/00 |

OTHER PUBLICATIONS

"Wind Turbine Power Calculations, RWE npower renewables" [online], Mechanical and Electrical Engineering, Power Industry, The Royal Academy of Engineering, [retrieved on Feb. 24, 2011], 5 pp., Retrieved From the Internet: http://www.raeng.org.uk/education/diploma/maths/pdf/exemplars_advanced/23_Wind_Turbine.pdf.

(Continued)

*Primary Examiner* — Edward Look
*Assistant Examiner* — Danielle M Christensen
(74) *Attorney, Agent, or Firm* — Dawn-Marie Bey; Bey & Cotropia PLLC

(57) ABSTRACT

A turbine blade is provided having a double helix shape with solid cross section. The turbine blades described herein may be adapted to be deployed in water or air such that usable energy may be extracted therefrom. The turbine blades may include a first and second endpoint located a distance apart on a central axis, with a helical edge spiraling in a directional rotation about the central axis from the first endpoint to the second endpoint. The turbine blade may also include a second helical edge spiraling in the same directional rotation about the central axis from the first endpoint to the second endpoint, such that the second helical edge is approximately congruent to the first helical edge and is located a distance from the first helical edge which defines a diameter.

17 Claims, 7 Drawing Sheets

(56) References Cited

U.S. PATENT DOCUMENTS

| | | | |
|---|---|---|---|
| 4,165,468 A | 8/1979 | Fry et al. | |
| 4,168,556 A | 9/1979 | Fink et al. | 114/264 |
| 4,266,143 A | 5/1981 | Ng | 290/53 |
| 4,317,047 A | 2/1982 | de Almada | 290/53 |
| 4,317,330 A * | 3/1982 | Brankovics | 60/398 |
| 4,340,821 A | 7/1982 | Slonim | 290/53 |
| 4,340,936 A | 7/1982 | Mounce | 701/200 |
| 4,352,023 A | 9/1982 | Sachs et al. | 290/42 |
| 4,405,866 A | 9/1983 | Mosuda et al. | 290/53 |
| 4,412,417 A * | 11/1983 | Dementhon | 60/497 |
| 4,423,334 A | 12/1983 | Jacobi et al. | 290/53 |
| 4,438,343 A | 3/1984 | Marken | 290/53 |
| 4,490,232 A * | 12/1984 | Lapeyre | 204/278 |
| 4,490,621 A | 12/1984 | Watabe et al. | 290/42 |
| 4,527,951 A | 7/1985 | Trier | 416/145 |
| 4,531,063 A | 7/1985 | Vielmo et al. | 290/53 |
| 4,549,267 A | 10/1985 | Drabouski, Jr. | 701/124 |
| 4,624,624 A | 11/1986 | Yum | |
| 4,631,921 A | 12/1986 | Linderfelt | 60/501 |
| 4,674,324 A | 6/1987 | Benoit | 73/65.03 |
| 4,708,592 A | 11/1987 | Krolick et al. | 416/176 A |
| 4,748,338 A | 5/1988 | Boyce | 290/42 |
| 4,781,023 A | 11/1988 | Gordon | 60/506 |
| 4,785,404 A | 11/1988 | Sims et al. | 701/200 |
| 4,843,250 A | 6/1989 | Stupakis | 290/53 |
| 4,849,647 A * | 7/1989 | McKenzie | 290/54 |
| 4,851,704 A | 7/1989 | Rubi | 290/53 |
| 4,868,408 A * | 9/1989 | Hesh | 290/52 |
| 4,872,118 A | 10/1989 | Naidenov et al. | 701/124 |
| 4,954,110 A | 9/1990 | Warnan | 441/22 |
| 5,048,356 A | 9/1991 | Levko | 74/60 |
| 5,268,881 A | 12/1993 | Damm | 368/134 |
| 5,341,757 A | 8/1994 | Digiacomo | 114/230.27 |
| 5,411,422 A | 5/1995 | Robertson | 440/48 |
| 5,421,354 A | 6/1995 | Bolton | |
| 5,424,582 A | 6/1995 | Trepl, II et al. | 290/53 |
| 5,452,216 A | 9/1995 | Mounce | 701/214 |
| 5,460,099 A | 10/1995 | Matsuhisa et al. | 105/148 |
| 5,499,889 A | 3/1996 | Yim | 405/76 |
| 5,608,160 A | 3/1997 | Chastonay | 73/65.03 |
| 5,696,413 A | 12/1997 | Woodbridge et al. | 310/15 |
| 5,770,893 A | 6/1998 | Youlton | 290/53 |
| 5,789,826 A | 8/1998 | Kumbatovic | 290/53 |
| 5,908,122 A | 6/1999 | Robinett et al. | 212/275 |
| 5,924,845 A | 7/1999 | Bagley et al. | 416/145 |
| 5,929,531 A | 7/1999 | Lagno | 290/53 |
| 6,020,653 A | 2/2000 | Woodbridge et al. | 290/53 |
| 6,106,411 A | 8/2000 | Edwards | 473/292 |
| 6,216,625 B1 | 4/2001 | Baluha | 114/230.27 |
| 6,308,649 B1 | 10/2001 | Gedeon | 114/39.11 |
| 6,441,516 B1 | 8/2002 | Kaelin et al. | 310/36 |
| 6,616,402 B2 | 9/2003 | Selsam | 415/3.1 |
| 6,626,638 B2 * | 9/2003 | Rosefsky | 415/4.3 |
| 6,647,716 B2 | 11/2003 | Boyd | 60/398 |
| 6,681,572 B2 | 1/2004 | Flory | 60/507 |
| 6,823,810 B2 | 11/2004 | Carlson et al. | 114/125 |
| 6,833,631 B2 | 12/2004 | Van Breems | 290/42 |
| 6,864,614 B2 | 3/2005 | Murray | 310/216 |
| 6,994,047 B1 | 2/2006 | Pent, III | 114/230.27 |
| 7,042,110 B2 | 5/2006 | Mikhail et al. | 290/44 |
| 7,105,939 B2 | 9/2006 | Bednyak | 290/42 |
| 7,143,363 B1 | 11/2006 | Gaynor et al. | 715/771 |
| 7,199,481 B2 | 4/2007 | Hirsch | 290/42 |
| 7,239,038 B1 | 7/2007 | Zimmerman et al. | 290/54 |
| 7,241,105 B1 | 7/2007 | Vanderhye et al. | |
| 7,298,054 B2 | 11/2007 | Hirsch | 290/42 |
| 7,362,004 B2 | 4/2008 | Becker | 290/55 |
| 7,375,436 B1 | 5/2008 | Goldin | 290/42 |
| 7,436,082 B2 | 10/2008 | Ruse et al. | 290/42 |
| 7,440,848 B2 | 10/2008 | Anderson | 701/207 |
| 7,453,165 B2 | 11/2008 | Hench | 290/53 |
| 7,538,445 B2 | 5/2009 | Kornbluh et al. | 290/53 |
| 7,557,456 B2 | 7/2009 | Kornbluh et al. | 290/42 |
| 7,625,255 B2 | 12/2009 | Ide et al. | 440/88 M |
| 7,629,704 B2 | 12/2009 | Hench | 290/53 |
| 7,649,276 B2 | 1/2010 | Kornbluh et al. | 290/53 |
| 7,728,454 B1 * | 6/2010 | Anderson, Jr. | 290/54 |
| 2001/0000197 A1 | 4/2001 | Gorlov | 114/274 |
| 2003/0173922 A1 | 9/2003 | Pelonis | 318/439 |
| 2004/0046474 A1 | 3/2004 | Kalsi | 310/179 |
| 2004/0239199 A1 | 12/2004 | Qu et al. | 310/114 |
| 2005/0285407 A1 | 12/2005 | Davis et al. | 290/54 |
| 2006/0153682 A1 | 7/2006 | Vanderhye et al. | |
| 2007/0029807 A1 * | 2/2007 | Kass | 290/55 |
| 2007/0137195 A1 | 6/2007 | Tayla et al. | 60/397 |
| 2007/0138793 A1 | 6/2007 | Zimmerman et al. | 290/1 R |
| 2007/0251230 A1 | 11/2007 | Zimmerman et al. | 60/497 |
| 2008/0054639 A1 | 3/2008 | Maier et al. | 290/40 R |
| 2008/0093858 A1 | 4/2008 | Hench | 290/53 |
| 2008/0224472 A1 | 9/2008 | Bean | 290/42 |
| 2008/0265582 A1 | 10/2008 | Hench | 290/53 |
| 2009/0008942 A1 | 1/2009 | Clement et al. | 290/53 |
| 2009/0022597 A1 * | 1/2009 | Bowie | 416/223 R |
| 2009/0127856 A1 | 5/2009 | Hench | 290/42 |
| 2009/0160191 A1 | 6/2009 | Beane | 290/53 |
| 2010/0072752 A1 | 3/2010 | Park et al. | 290/52 |
| 2010/0123315 A1 | 5/2010 | Anderson, Jr. | 290/53 |
| 2010/0148512 A1 | 6/2010 | Pitre | 290/54 |
| 2011/0012358 A1 | 1/2011 | Brewster et al. | 290/53 |
| 2011/0081243 A1 * | 4/2011 | Sullivan | 416/120 |
| 2011/0278847 A1 | 11/2011 | Hench et al. | 290/53 |
| 2012/0243994 A1 | 9/2012 | Saeed | |

OTHER PUBLICATIONS

"Producing Renewable Electricity with a Hybrid, Bluenergy Solarwind Turbine," 2 pp., Copyright 2009-2011, www.bluenergyusa.com.

"Development of the Helical Reaction Hydraulic Turbine," Final Technical Report, Project Period: Jul. 1, 1996-Jun. 30, 1998, Submission to: The US Department of Energy, Prepared by: Dr. Alexander Gorlov, PI, MIME Department, Northeastern University, 59 pp., Aug. 1998.

Rasila, Mika, "Torque and Speed Control of a Pitch Regulated Wind Turbine," Department of Electric Power Engineering, Chalmers University of Technology, Goteborg, Sweden, 67 pp., 2003.

Specification and Drawings for U.S. Appl. No. 12/778,586, filed May 12, 2010, 20 pp.

Brekken, T.K.A., von Jouanne, A. HaiYue Han, "Ocean Wave Energy Overview and Research at Oregon State University," School of Electr. Eng. & Comp. Sci., Oregon State Univ., Corvallis, OR, Power Electronics and Machines in Wind Applications, PEMWA 2009, IEEE, Jun. 24-26, 2009.

Khan, Jahangir and Bhuyan, Gouri S., "Ocean Energy: Global Technology Development Status," A report prepared by Powertech Labs Inc. for the IEA-OES under Annex I-Review, Exchange and Dissemination of Information on Ocean Energy Systems, IEA-OES Document No. T0104, 83 pp., Mar. 2009.

International Search Report and Written Opinion issued for PCT/US2009/031675, dated Mar. 30, 2009, 8 pp.

Timmons, Heather, "Energy From the Restless Sea," The New York Times, Aug. 3, 2006, New York, New York.

"UBC Entrepeneurs Harness Wave Energy" [online], UBC This Week, Mar. 9, 2006 [retrieved on Apr. 16, 2010], 4 pp., Retrieved From the Internet: http://www.publicaffairs.ubc.ca/ubcthisweek/2006/06mar09.html.

Alves, Marco, et al., "Hydrodynamic Optimization of a Wave Energy Converter Using a Heave Motion Buoy," *Proceedings of the 6th Int. Conf on Wave and Tidal Energy*, Porto, Portugal, 2007.

"Pelamis Wave Energy Converter" [online], [retrieved on Apr. 23, 2012], 4 pp., Retrieved From the Internet: http://en.wikipedia.org/wiki/Pelamis_Wave_Energy_Converter.

Evans, Paul, "Ocean-Power Installation Up and Running," gizmag, Mar. 2, 2009 [retrieved on Apr. 23, 2012], 5 pp., Retrieved From the Internet: http://www.gizmag.com/wave-power-owc/11122/.

von Jouanne, A., Brekken, T.K.A., "Creating Energy From Ocean Waves" [online], Wallace Energy Systems & Renewables Facility, Oregon State University, Copyright 2012 [retrieved on Apr. 23, 2012], 2 pp., Retrieved From the Internet: http://eecs.engr.oregonstate.edu/wesrf/.

(56) References Cited

OTHER PUBLICATIONS

World Energy Council, "2007 Survey of Energy Resources," Ocean Thermal Energy Conversion, 9 pp.

Kane, M., "California Small Hydropower and Ocean Wave Energy Resources," In Support of the 2005 Integrated Energy Policy Report, Presented at: California Energy Commission, Sacramento, California, 29 pp., May 9, 2005.

Previsic, Mirko, et al., "E21 EPRI Assessment, Offshore Wave Energy Conversion Devices," Electricity Innovation Institute, 52 pp., Jun. 16, 2004.

Bedard, Roger, "Feasibility of Using Wavewatch III for Days-Ahead Output Forecasting for Grid Connected Wave Energy Projects in Washington and Oregon, Stage Gate #2 Final Report, EPRI-WP012," Electric Power Research Institute, 78 pp., Feb. 29, 2008.

Bedard, Roger, et al., "North American Ocean Energy Status—Mar. 2007," 8 pp.

Rondorf, Neil, "A Virginia-Based Marine Renewable Energy Technologies," Presentation to VRTAC, 19 pp., Sep. 19, 2006.

Koola, Paul Mario, et al., "The Dynamics of Wave Carpet, a Novel Deep Water Wave Energy Design," *Oceans 2003 Proceedings*, vol. 4, pp. 2288-2293, Sep. 22-26, 2003, San Diego, California.

Kim, Jin-Ha, et al., "An Experimental Study on the Reverse Wave Drift Force of a BBDB Type OWC Wave Energy Device," *Proceedings of The Seventh (2006) ISOPE Pacific/Asia Offshore Mechanics Symposium*, pp. 237-242, Dalian, China, Sep. 17-21, 2006.

"Linear Control of Wave Energy Converters" [online], Lancaster University Renewable Energy Group—Wave Energy, [retrieved on Jun. 12, 2012], 3 pp., Retrieved From the Internet: http://www.engineering.lancs.ac.uk/lureg/group_research/wave_energy_research/Linear_C . . . .

International Search Report and Written Opinion for Application No. PCT/US2011/027635, dated May 25, 2011, 9 pp.

"Wooden Low-RPM Alternator" [online], Copyright 2000 [retrieved on Mar. 29, 2012], 15 pp., Retrieved From the Internet: http://www.otherpower.com/pmg2.html.

* cited by examiner

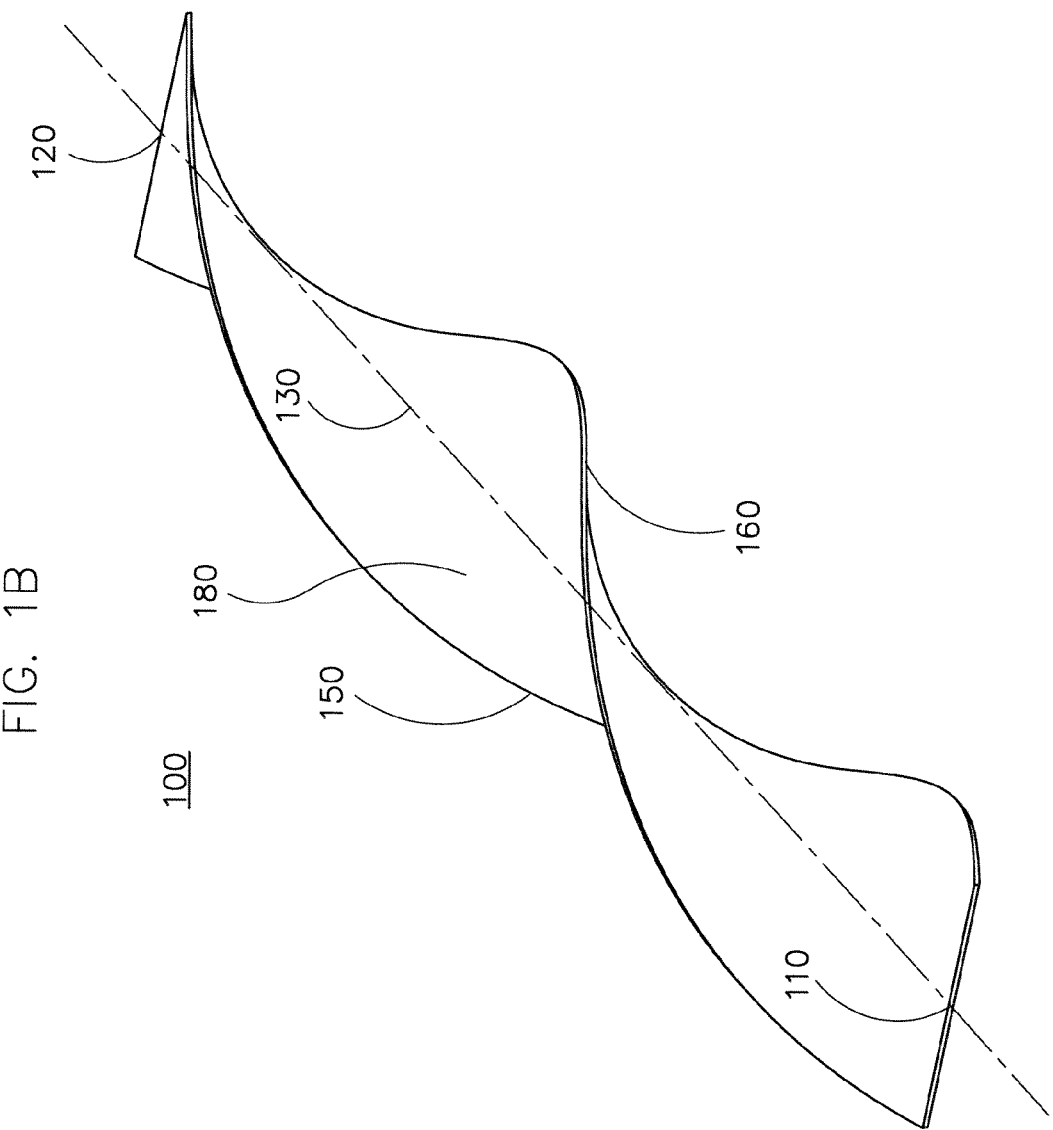

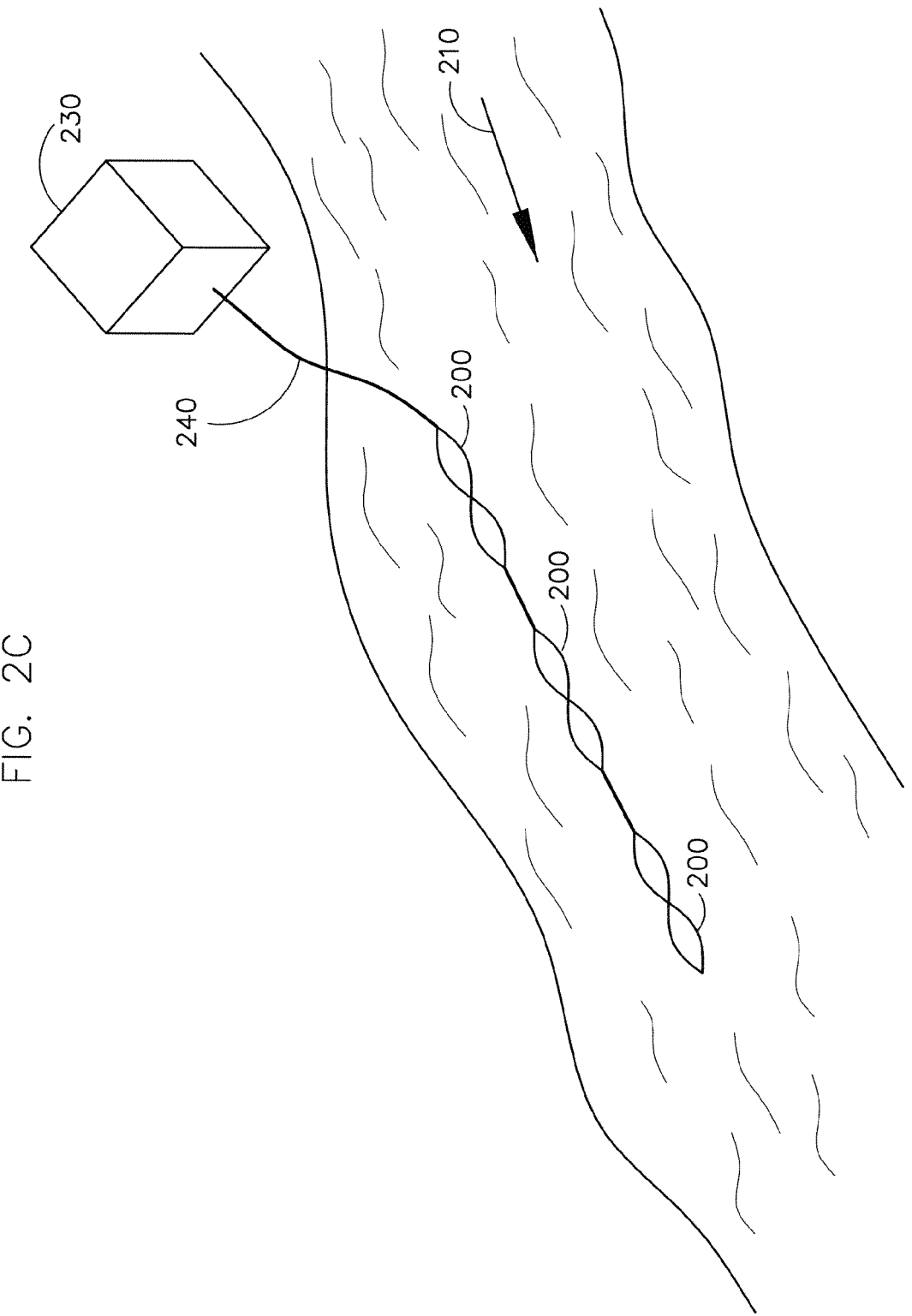

PROPELLER-TYPE DOUBLE HELIX TURBINE APPARATUS AND METHOD

FIELD OF THE INVENTION

The invention relates generally to an apparatus and method for extracting energy from a medium. More particularly, the invention relates to a turbine blade having a double helix shape with solid cross section and adapted to be deployed in water or air such that usable energy may be extracted therefrom.

BACKGROUND

The modern lifestyle has become increasingly dependent upon the use and existence of fossil fuels such as coal, petroleum and natural gas. In fact, more than half of all power consumed since the industrial revolution has occurred in only the last two decades, with more than 80% derived from the combustion of fossil fuels. In the United States, these fuels accounts for nearly two-thirds of the total electricity produced and the vast majority of all energy used for transportation.

Due to the ubiquitous consumption of fossil fuels, supplies of this non-renewable energy source are dwindling as environmental problems continue to mount. The burning of fossil fuels produces many environmentally-significant byproducts, including carbon dioxide, a greenhouse gas that traps heat in the earth's atmosphere. Over the last 150 years, burning fossil fuels has resulted in more than a 25% increase in the amount of carbon dioxide in the earth's atmosphere and more than 90% of U.S. greenhouse gas emissions is the result of such combustion. Moreover, other poisonous gasses such as carbon monoxide, nitrogen oxides, sulfur oxides, and hydrocarbons released during combustion of these fuels have reduced air quality throughout the world.

These pollution-related concerns, coupled with high oil prices, increased political tension with the worlds' largest petroleum suppliers, and increasing government support have lead to a number of advances in large-scale renewable energy technologies capable of harnessing energy from natural, constantly-replenished sources, such as solar power, water waves and tides, wind, and hydrogen. Fortunately, the use of renewable energy technologies, such as wind and water turbines, has increased over the past decade due to decreased costs of both production and deployment and increases in efficiency. However, many conventional wind and water turbines still require large amounts of capital to produce and require both special machinery and large amounts of real estate for deployment and use. As such, the use of such technology in rural and remote areas, where energy may be crucial for survival or just desired for recreation, has mostly been prevented.

U.S. Patent Publication No. 2010/0148512 to Pitre, discloses an in-stream apparatus for generating electricity from fluid flows, such as shallow river and tidal flows. The invention is said to comprise a generator housed in a prolate-shaped (i.e. football-shaped) buoyant casing around which two helicoid-shaped blades are wound. The helicoid-shaped blades are interleaved, and the entire apparatus is aligned such that the casing and axis of rotation are generally said to be parallel with the fluid stream.

U.S. Pat. No. 5,411,422 to Robertson discloses a propeller comprising a one piece blade that spirals out from an angular solid hub portion as a continuous screw spiral. The propeller comprises a circular hub having an axial space around which the spiral screw portion winds. The spiral screw is said to have a helix configuration which defines an axial void through its center and is further said to increase in circumference as the distance from the hub increases.

U.S. Patent Publication No. 2001/0000197 to Gorlov describes a helical turbine assembly capable of providing high speed unidirectional rotation under a multidirectional ultra low-head fluid flow. The turbine is said to comprise a plurality of airfoil-shaped helical turbine blades supported for rotation on a rotatable shaft. Further, the entire blade combination is disclosed as being mounted for rotation within a protective cage structure.

Accordingly, there is a need in the art for an apparatus and method to allow renewable energy to be harnessed in remote or rural areas, without requiring the use of special equipment or more than a single person. In addition to portability, there is a need for such an apparatus to be durable, safe to handle and use, and relatively inexpensive to both produce and maintain. It would be beneficial if such an apparatus was capable of producing usable power in low-flow velocity environments such as slow moving streams or when pulled behind a sailboat.

SUMMARY OF THE INVENTION

Exemplary embodiments described herein overcome the above described drawbacks of conventional renewable energy technologies by providing inexpensive, durable turbine blades capable of being deployed in liquid or gas mediums, such as water or air, to efficiently and safely extract energy therefrom. In certain embodiments, the turbine blades may allow for the efficient extraction of energy at low-flow velocities, such as velocities less than about 3.0 m/s. The turbine blades described herein may be adapted to be connected to a generator via a tethering means such that rotational energy may be translated from the turbine blade through the tethering means and received at the generator. Turbine and turbine blade embodiments described herein may be transported, deployed, and/or removed from a medium by a single person, and require minimal maintenance. In other embodiments, the turbine blades described herein may be used for propulsion of aquatic vehicles and the like.

In one exemplary embodiment, a turbine blade adapted to rotate in response to a fluid flow is provided. The turbine blade may include a first endpoint and a second endpoint located a distance apart on a central axis; a first helical edge spiraling in a directional rotation about the central axis from the first endpoint to the second endpoint; and a second helical edge spiraling in the directional rotation about the central axis from the first endpoint to the second endpoint, the second helical edge being approximately congruent to the first helical axis and being connected to the first helical edge by a material such that the distance between the first helical edge and second helical edge defines a diameter of the turbine blade, and such that the turbine blade approximates a double helix in shape having a solid cross section and a pitch-to-diameter ratio of from about 1:1 to about 10:1.

In another exemplary embodiment, a system for producing electrical energy from a fluid medium is provided. The system may include a turbine blade submersed or partially submersed in the flowing fluid medium and being adapted to receive energy from the medium and produce mechanical energy therefrom. The turbine blade of the system may include a first endpoint and a second endpoint located a distance apart on a central axis; a first helical edge spiraling in a directional rotation about the central axis from the first endpoint to the second endpoint; and a second helical edge spiraling in the directional rotation about the central axis from the first endpoint to the second endpoint, the second helical edge being connected to the first helical edge by a material such that the distance between the first helical edge and second helical edge defines a diameter of the turbine blade, and such that the turbine blade approximates a double helix in shape having a pitch-to-diameter ratio of about 1:1 to about 10:1. The system may also include a generator adapted to convert mechanical energy to electrical energy; and a tethering means in communication with the turbine blade and the generator, the tethering means adapted to translate mechanical energy from the turbine blade to the generator.

BRIEF DESCRIPTION OF THE DRAWINGS

The preferred embodiments of the present invention are illustrated by way of example and are not limited to the following figures:

FIG. 1b illustrates a view of a turbine blade according to an exemplary embodiment along a central axis.

FIG. 2c illustrates a turbine system according to an exemplary embodiment.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions. All terms used herein are intended to have their ordinary meaning in the art unless otherwise provided As used herein the term "turbine blade" refers to an apparatus that may be rotated by the force of a medium. Specifically, exemplary turbine blade embodiments discussed herein may be adapted to be rotated when contacted by a flow of a gas, such as air, or a liquid, such as water.

Turbine blade embodiments discussed below may be in communication with a generator, such as by tethering one end of a tethering means to both a generator and a turbine blade. As used herein the teen "generator" refers to any apparatus adapted to convert mechanical energy to electrical energy. It will be recognized that many generators exist in the art, and a number of generators capable of producing electrical energy from rotational energy are thought to be acceptable for use with the turbine blades discussed herein. By way of specific example, the energy conversion system described in U.S. patent application Ser. No. 12/778,586, titled "Radial Flux Permanent Magnet Alternator With Dielectric Stator Block," incorporated by reference herein in its entirety, may be used.

As used herein the term "turbine" refers to a system comprising one ore more turbine blades in communication with a generator. It will be appreciated that a turbine blade may be connected, attached, coupled, tied, tethered or otherwise placed in communication with a generator via any number of tethering means such as but not limited to ropes, cables, wires, chains, rods and/or other connective devices known in the art.

Turbine and turbine blade embodiments of the present invention provide one or more double-helix shaped turbine blades having a solid cross section and being adapted for use in a medium such as water or air. Turbine blades described herein may be adapted to be rotated about a central axis in response to a force such as waves, tidal flows, or wind such that rotational energy may be produced therefrom. In certain embodiments, one or more turbine blades may be adapted to be dragged, pulled, or towed behind an aquatic vessel in a drogue configuration. In other embodiments, one or more turbine blades may be adapted to propel an aquatic vehicle.

Figure 1A:
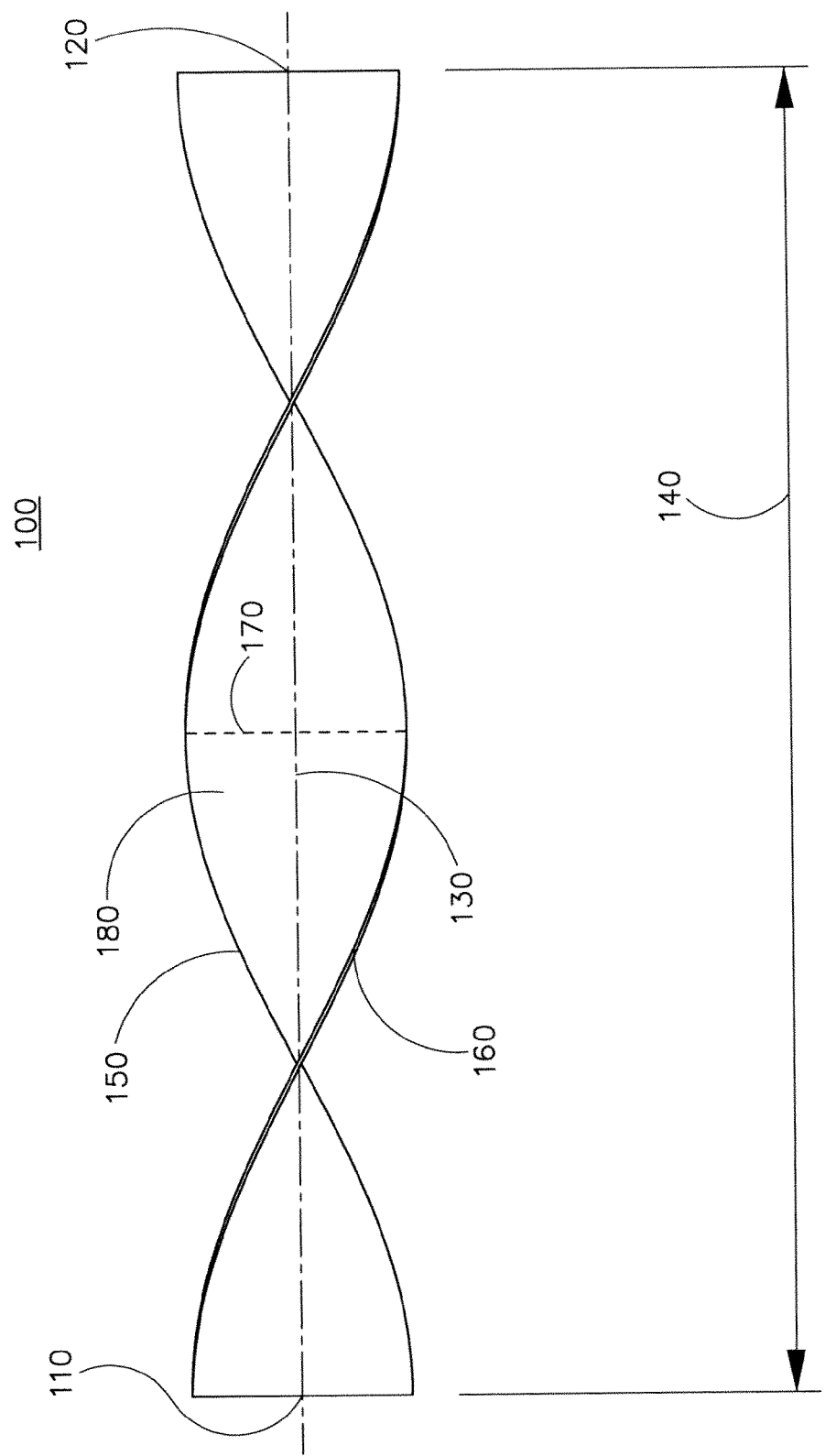
FIG. 1a illustrates an overhead view of a turbine blade according to an exemplary embodiment.

Referring to FIG. 1a, one embodiment of a turbine blade 100 according to the instant invention is illustrated, wherein the turbine blade resembles a double helix having a solid cross section, spiraled about a central axis 130. As shown, the turbine blade comprises a first endpoint 110 and a second endpoint 120 lying on the same axis 130, referred to herein as a "central axis," at a certain length 140 apart.

In the pictured embodiment, the turbine blade comprises a first helical edge 150 and a second helical edge 160 spiraling in a right rotation about the central axis 130 from the first endpoint 110 to the second endpoint 120. As shown, the first helical edge 150 and second helical edge 160 are located a distance 170 apart from each other (referred to herein as "diameter" of the turbine blade) and are connected by a material 180. Generally, the first helical edge 150 and second helical edge 160 are approximately congruent and are located equidistant from the central axis 140. Moreover, the first helical edge 150 and second helical edge 160 may be described as being out of phase, such that the turbine blade 100 approximates a double helix in shape.

In one embodiment, the diameter 170 of the turbine blade 100 is shortest at the endpoints 110, 120, although a fixed diameter is generally maintained throughout the majority of the blade. In other words, the turbine blade 100 may comprise a fixed diameter 170 throughout, although it may be tapered near the endpoints 110, 120. In an alternative embodiment, the diameter of the turbine blade 100 may reach a maximum value at or about a midpoint between the first endpoint 110 and the second endpoint 120. In other embodiments, the diameter of the turbine blade 100 may vary throughout the length of the blade.

It will be appreciated that, although the turbine blade 100 is shown in a right rotation orientation about the central axis 130, the turbine blade is equally effective in a left rotation orientation about the central axis. However, it is preferred for the first helical edge 150 and second helical edge 160 to have the same direction of rotation about the central axis 130 such that the turbine blade 100 approximates a solid double helix in shape. Moreover, it will be appreciated that the turbine blade 100, although described herein as having a double-helix shape, need not be in the shape of a mathematically perfect double helix and, as described in detail below, the exact shape of the turbine blade 100 will vary depending on desired use.

As illustrated, the turbine blade 100 comprises a length 140 defined by the distance between the first endpoint 110 and the second endpoint 120. The length 140 of the turbine blade 100 may vary according to such variables as: desired use, construction materials 180, deployment medium, necessity of portability, cost of production, generator used, tethering means and the like. An ordinarily skilled artisan will recognize that the length of the turbine blade 100 may comprise nearly any length 140 from an inch or smaller, to many tens of feet the size only limited by the variables listed above. For example, in one embodiment, the turbine blade 100 may be of a length 140 that allows for the blade to be transported, deployed, and/or removed from a medium by a single person. According to this embodiment, the turbine blade 100 may comprise a length 140 of from about 0.25 meters to about 5 meters in length, including all values therebetween. Thus, a portable turbine blade 100 may comprise a length of about 0.25 meters, about 0.5 meters, about 1 meter, about 1.5 meters, about 2 meters, about 2.5 meters, about 3 meters, about 3.5 meters, about 4 meters, about 4.5 meters or about 5 meters, including all values in between. In one preferred embodiment, the length of a portable turbine blade is from about 1.5 meters to about 3 meters. It will be appreciated that the portability of the turbine blade 100 will depend on both the length 140 and the materials 180 used in its construction.

In another embodiment, the turbine blade 100 may comprise a length 140 greater than about 5 meters and may require more than one person to transport, deploy and/or remove the turbine blade 100 from a medium. In this embodiment, the turbine blade 100 may comprise a length 140 of from greater than about 5 meters to greater than about 30 meters. Again, it will be appreciated that the length 140 of a turbine blade 100 may be selected according to the desired use and materials 180 used for construction.

The turbine blade 100 comprises a diameter 170 defined as the distance between the first helical edge 150 and the second helical edge 160 at a point along the length 140 of the turbine blade. It will be appreciated that the diameter 170 can vary along the length 140 of the blade 100, although it will typically be shorter than the length of the blade. In one embodiment, the diameter 170 of the turbine blade is fixed throughout the majority of the length of the blade. As shown, the turbine blade 100 may be tapered near the endpoints 110, 120, such that the diameter 170 reaches a minimum value at the endpoints 110, 120.

In certain embodiments, the turbine blade may comprise a maximum diameter 170 of from about 0.01 meters to about 5 meters including all values in between. The diameter 170 of the turbine blade 100 will generally be smaller than the length 140 of the blade, and may be selected such that the turbine blade approximates a double helix in shape.

Still referring to FIG. 1A, the turbine blade is shown to have a pitch. As used herein, the term "pitch" refers to the distance required for the turbine blade 100 to complete at least one turn or rotation about its central axis 130, without slipping. Generally, as the pitch of a propeller or blade is decreased (i.e., the required distance for a complete turn about the central axis is shortened), the amount of torque produced at slower speeds (i.e. less revolutions per given time period) increases. Conversely, as the pitch is increased (i.e., the required distance for a complete turn about the central axis is lengthened), the top speed at which the propeller will generate additional torque is increased, although the acceleration is decreased. Further, it will be appreciated that the maximum pitch is limited by the development of turbulence and/or cavitation as laminar flow of a medium through the turbine blade 100 is restricted.

In certain embodiments, the turbine blade 100 may be constructed with a pitch less than, equal to, or greater than the length 140 of the turbine blade. For example, the pitch may be equal to about 0.75×L, about L, about 1.25×L, or about 1.5× L, where L is the length 140 of the blade 100. It will be appreciated that the turbine blade 100 is not limited to any particular pitch-to-length ratio, although in one preferred embodiment the pitch may be about equal to the length 140 of the turbine blade 100.

The turbine blades 100 described herein may be designed such that slip rates are reduced relative to conventional propeller-type turbines, which generally comprise pitch-to-diameter ratios of about 6:1. Accordingly, the diameter 170 and pitch of the turbine blade 100 may be selected such that the pitch-to-diameter ratio is from about 1:1 to about 10:1. More specifically, the turbine blade 100 may comprise a pitch-to-diameter ratio from about 3:1 to about 5:1 or from about 3.5:1 to about 4.5:1. In other embodiments, the pitch-to-diameter ratio of the turbine blade 100 may be about 1.5:1, about 2.5:1, about 3.5:1, about 4.5:1, about 5.5:1, about 6.5:1, about 7.5:1, about 8.5:1, about 9.5:1 or about 10:1, including all values therebetween.

Generally, the turbine blade 100 may be constructed of any number of materials 180, including but not limited to woods; metals including steel and other alloys; and plastics such as rubber, synthetic rubber, polyvinyl chloride (PVC), polyethylene terephthalate, high density polyethylene, low density polyethylene, polypropylene, polystyrene, and others. Preferably, the material selected may be both strong and lightweight. Particular materials 180 worth mentioning are composites such as fiber glass and/or carbon fiber, as these materials are both lightweight and durable.

If desirable, the turbine blade 100 may comprise a material that is buoyant in fresh and/or salt water. In other embodiments, the turbine blade 100 can comprise less buoyant materials, such as when the turbine blade 100 is used in air, tethered at a particular depth, or when the turbine blade is pulled behind a boat or other aquatic vehicle in a drogue configuration. In these embodiments, it is unnecessary and/or undesirable for the turbine blade 100 to float.

It will be appreciated that, although the turbine blade 100 may comprise a coped or smooth surface, the shape of the blade allows for effective use even when the surface is unfinished or rough. Accordingly, the turbine blade 100 may be suitable in low-maintenance situations where debris can strike the surface of the blade causing imperfections. In one embodiment, the turbine blade 100 may be reinforced at or about one or both endpoints, such that the blade may be made to resist breakage from debris. For example, the leading edge of the turbine blade 100 may comprise a layer or covering of metal or other material. In other embodiments, the first helical edge 150 and/or second helical edge 160 may be reinforced throughout the entirety or a portion of the turbine blade 100. In yet another embodiment, the turbine blade 100 may be coated in a material such that biofouling is prevented or slowed.

Referring to FIG. 1B, an embodiment of the turbine blade 100 is illustrated as viewed along a central axis 130. Unlike typical propeller-type turbines that comprises multiple blades connected to a central shaft, in preferred embodiments, the turbine blade 100 does not comprise a central shaft, hub, or rod. Accordingly, the turbine blades 100 described herein do not suffer from the inefficiencies associated with conventional propeller-type turbines that present a smaller surface area to a given fluid medium due to the central shaft. Rather, the turbine blades 100 of the instant invention may be rotated effectively at slower flow velocities with minimal cavitation and/or ventilation. Moreover, unlike typical turbine blades that rarely extend beyond one-quarter to one-half or a rotation about a central shaft, the turbine blades 100 described herein may comprise one or more rotations about the central axis 130, allowing for increased efficiency in low-flow-velocity environments.

Traditional propeller designs are meant to operate at speeds of up 15,000 revolutions per minute ("RPM"). As a result, these blades may experience cavitation at low RPM (i.e., flow velocities below about 6 knots) and may experience a high degree of slipping (i.e. up to about 95%) in such an environment. The turbine blades 100 described herein, however, may experience less than about 5% slipping in the same low-flow-velocity environments.

In one embodiment, the turbine blade 100 can be constructed as a single, continuous piece, such as by three-dimensional printing, extrusion, casting, machining, forging or similar processes. In other embodiments, however, the turbine blade 100 may comprise multiple pieces connected by any connecting means known in the art. In yet other embodiments, the turbine blade 100 may be made by fiberglass hand lay-up techniques or the like.

Figure 2A:
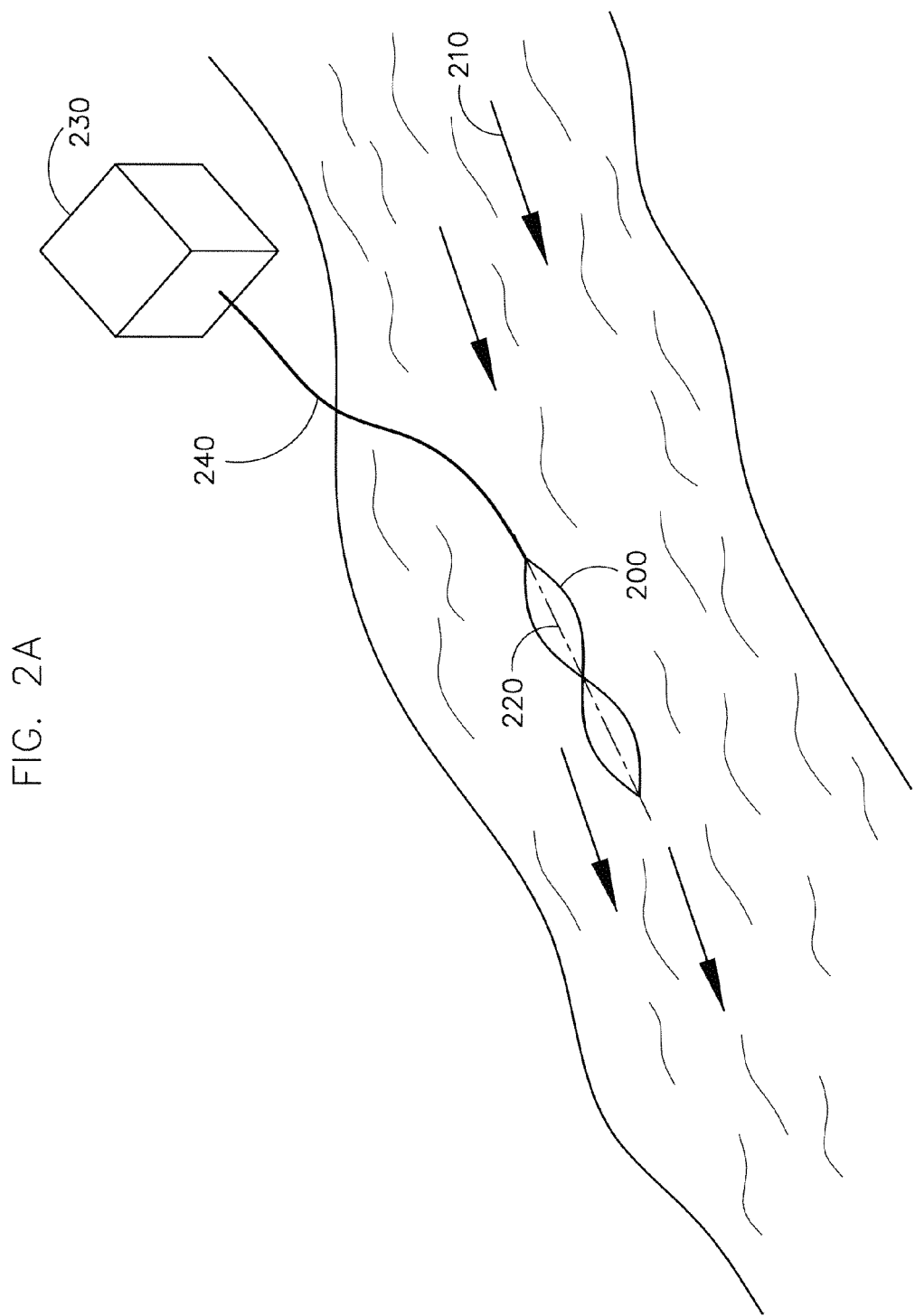
FIG. 2a illustrates a turbine system according to an exemplary embodiment.

Referring to FIG. 2A, a single turbine blade 200 is illustrated as partially breaching the surface of a flowing liquid medium such as a river or stream. Generally, the turbines described herein, which comprise one or more turbine blades 200 in communication with one or more generators 230, are thought to be useful for power generation in low-flow velocity environments and in water environments ranging in depth from a few inches to the deepest of oceans. By low-flow velocity it is meant that the turbine blades 200 may be employed in mediums having flow rates less than about 6 knots, or 3.0 m/s.

As shown, the turbine blade 200 is secured at or about the upstream endpoint by any tethering means 240 known in the art. The tethering means 240 may be attached to the turbine blade 200 via any means known in the art, such as for example, by creating a void in the body of the turbine blade 200 through which the tethering means may pass or by attaching a separate tethering means receiver to the turbine blade. The upstream end of the tethering means 240 is also attached, tied, coupled or in communication with a generator 230. In this way, as the turbine blade 200 rotates about an axis of rotation 220, the tethering means 240 is also rotated. Once the torque of the tethering means 240 exceeds a certain value, the generator may convert the rotational energy to electricity.

Generally, the amount of power P (kW) that may be produced by a turbine with a turbine blade rotating in a given medium may be represented by Equation 1, below. The power generated is directly proportional to the torque exerted upon the tethering means 240 by the turbine blade 200, and this torque may be translated to the generator 230 such that electricity may be produced therefrom.

$$P = \frac{1}{2} * \rho * A * v^3 * \eta * \sin(\phi) \quad \text{Equation 1}$$

where A is the swept area of the blade (m²); v is velocity of incoming flow; η is turbine efficiency; φ is the angle of the blade with respect to the direction of flow; and ρ is density of the medium (kg/m³).

It may be seen from Equation 1 that the power generated, and thus the torque generated, increases when the swept area A of a turbine blade 200 increases. Typically, this swept area will approximate Equation 2, below.

$$A = 2(rL + \pi r^2) \quad \text{Equation 2}$$

Accordingly, the turbine blades 200 of the instant invention are designed to present a maximum surface area to the flowing medium to maximize torque generation. By way of specific example, Table 1, below, illustrates the estimated power outputted at a flow rate of 0.75 m/s (1.5 knots) by a number of exemplary turbines comprising a generator in communication with different sized turbine blades 200 at an efficiency of between about 20 to about 25%.

TABLE 1

| Diameter (m) | Length (m) | Power Output (W) |
|---|---|---|
| 0.12 | 0.48 | 0.6 |
| 0.2 | .8 | 1.7 |
| 0.25 | 1.0 | 2.6 |
| 0.3 | 1.2 | 3.7 |
| 0.35 | 1.4 | 5.1 |
| 0.4 | 1.6 | 6.2 |
| 0.5 | 2.0 | 10.4 |
| 1.0 | 4.0 | 41.0 |

The exemplary turbines illustrated in Table 1 may each comprise a single turbine blade of the length and diameter shown and may have a pitch-to-diameter ratio of about 4:1. As shown, a turbine comprising a turbine blade 200 having a length of as small 4.0 meters may be capable of outputting more than 40 Watts of power depending on efficiency of the generator. Thus, such a portable turbine blade could be used to power a light bulb during, for example, a hiking trip or could be used to power a GPS system or a radio during, for example, a day of sailing. In another example, a larger turbine blade 200 could be used to power a food-heating source in a remote, or poverty-stricken region.

Equation 1, above, also shows that the angle at which the blade is situated in the medium is important in maximizing the output power. In one embodiment, the flowing water 210 naturally orients the turbine blade 200 such that the central axis is parallel or near parallel to the flow. Thus, the turbine blade 200 may be referred to as "self-aligning" or "self-trimming." By nearly parallel, it is meant that the turbine blade 200 may be oriented such that the central axis is within about 20, about 15, about 10, or about 5 degrees of the flow direction. It will be appreciated that a parallel orientation is preferred to maximize efficiency.

In a parallel or nearly parallel orientation, the flowing water 210 contacts the turbine blade 200 causing it to rotate about its central axis. As the turbine blade 200 is set into rotation, the water is cut and/or pulsed by each pitched face. Because the tethering means is fixed to the generator 230, the rotational energy absorbed by the rotating turbine blade 200 travels along the tethering means 240 to the generator 230.

As discussed above, the unique shape of the turbine blade 200 allows for relatively large amounts of rotational energy to be extracted from low-flow environments. The double-helix type shape of the turbine blade 200 can accelerate fluid flow around the periphery and provide an increased torque about its central axis when compared to comparably-sized propeller blades affixed to a solid central shaft. Moreover, the turbine blade's 200 unique shape also allows debris, such as rocks, sticks, branches or the like, to slide along the surface, reducing structural damage upon impact. Similarly, the turbine blade 200 may minimize the number of injuries and/or deaths of aquatic animals due to the relatively slow rotational speeds required to produce energy and the low profile of the blade. It will be appreciated that, although the generator 230 is shown above the surface of the water, in another embodiment, the turbine blade 200, generator 230, and tethering means 240, may each be located below the surface of the water.

Figure 2B:
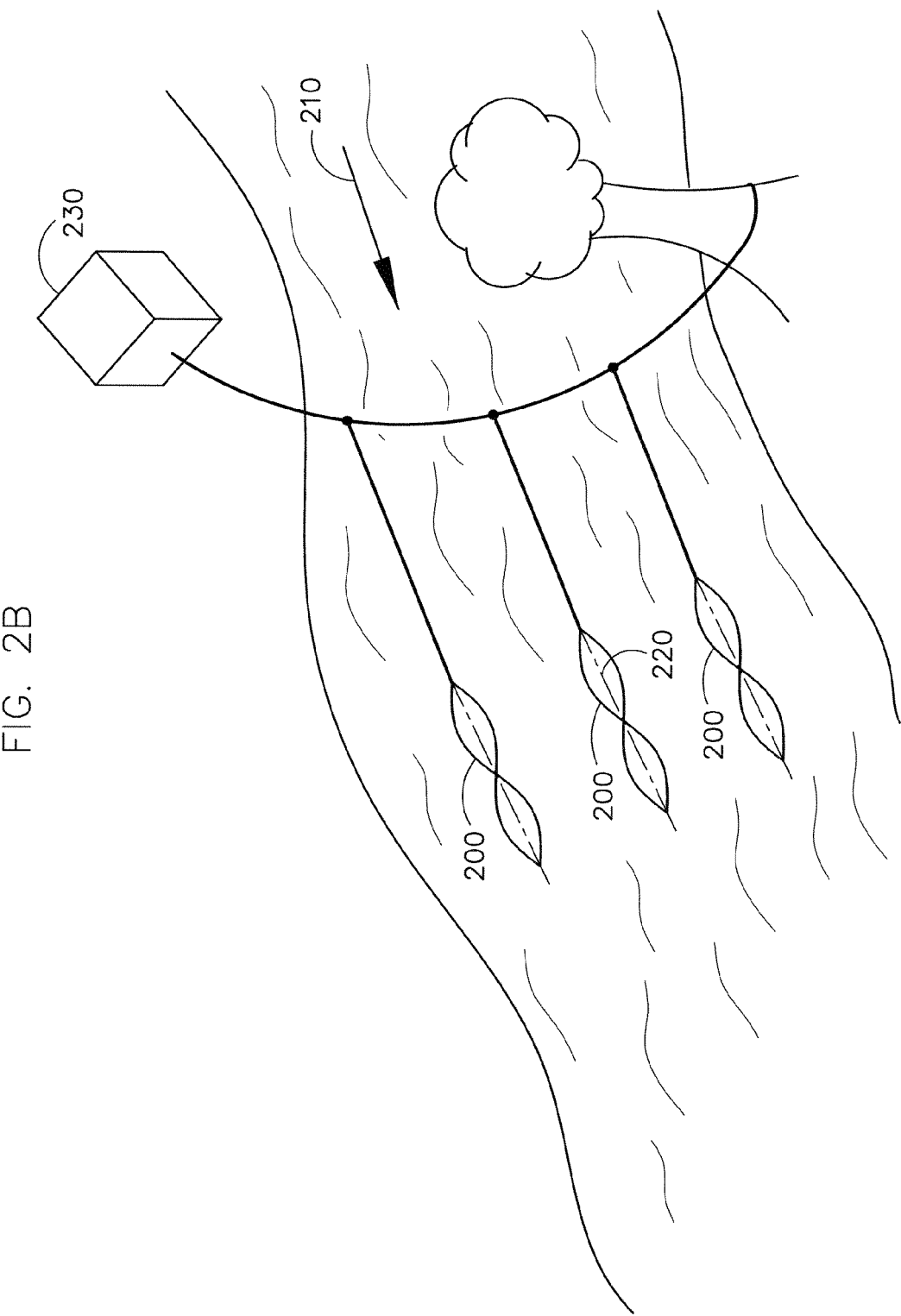
FIG. 2b illustrates a turbine system according to an exemplary embodiment.

Referring to FIG. 2B, a number of turbine blades 200 are shown connected to a single generator 230 via tethering means. As shown, each turbine blade 200 is in communication with a tethering means, such as a rope, chain or the like, and that that stretches across the flowing water 210. In the illustrated configuration, each turbine blade 200 may rotate, causing rotational energy to be translated through the tethering means to the generator 230. Although depicted as three turbine blades 200, it will be appreciated that any number of turbine blades 200 may be connected to one or more generators 230 via the tethering means 240.

Referring to FIG. 2C, a number of turbine blades 200 may be connected to each other via tethering means 240 in a "daisy chain" type configuration. As shown, the turbine blades 200 may be connected such that the upstream end of one turbine blade is connected to the downstream end of another turbine blade. The turbine blade 200 located the farthest upstream may have its upstream end tethered to a generator 230 via tethering means. It will be appreciated that each turbine blade 200 may be deployed at any number of depths and/or distances from the one or more generators 230 and/or from the other turbine blades.

Figure 3:
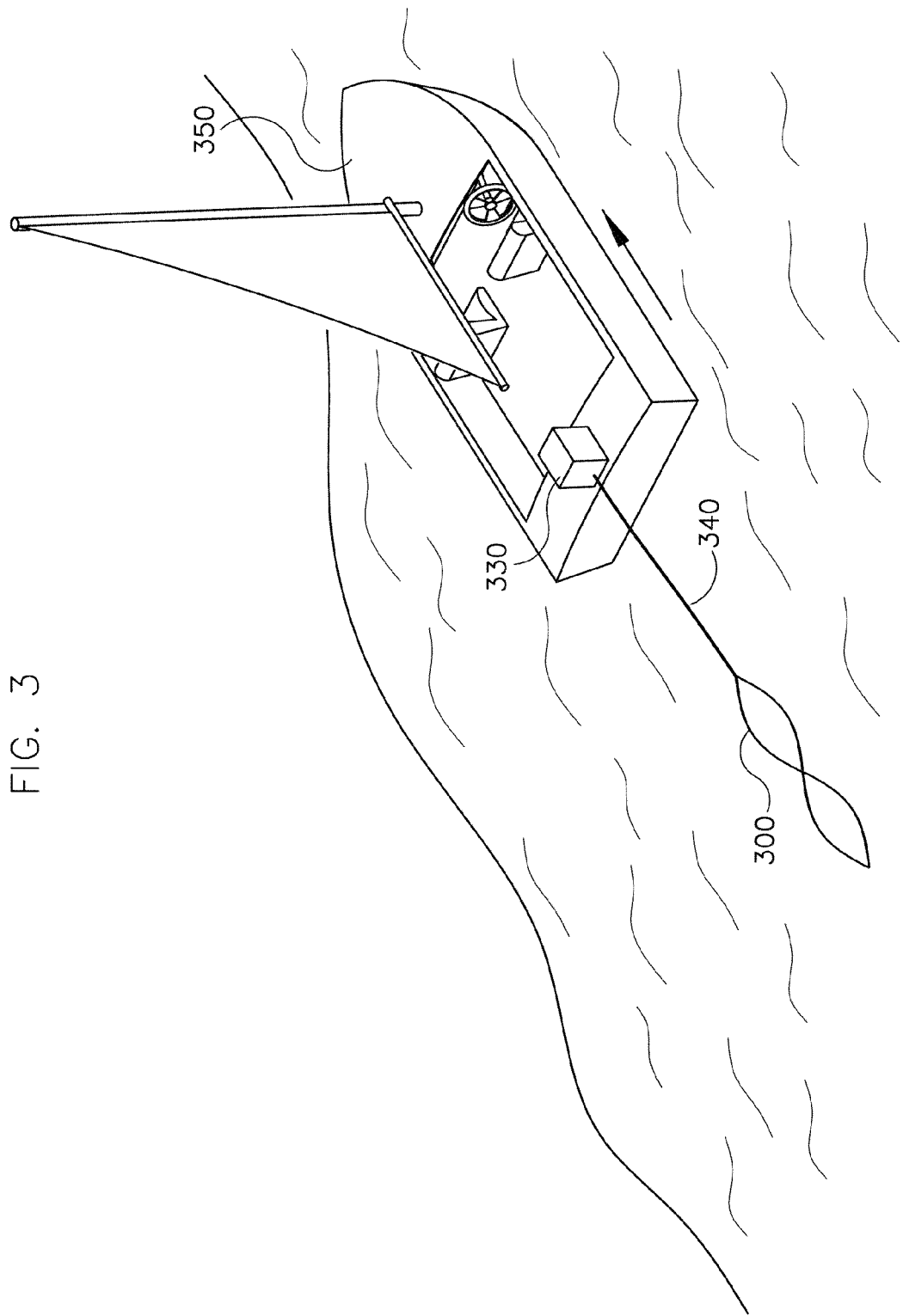
FIG. 3 illustrates a turbine system according to an exemplary embodiment.

Referring to FIG. 3, a turbine blade 300 is illustrated as being submerged or partially submerged behind an aquatic vehicle 350, such as a sailboat, canoe, kayak, or motor boat, in a drogue configuration. As shown, the turbine blade 300 is secured at the upstream face by any tethering means 340 to a generator 330 fixed to the aquatic vehicle 350. Using the force of the aquatic vehicle 350, the turbine blade 300 is accelerated through a liquid medium such as an ocean, river or lake. As the turbine blade 300 cuts through the water, it will be rotated about its central axis, producing rotational energy. This rotational energy may be translated through the tethering means 340 such that it is received by the generator 330 to be converted to electricity.

The turbine blades 300 described herein are most effective at velocities that are well-below the velocities required for conventional propeller-type turbines. As such, the turbine blades 300 of the instant invention are considered safer and may be dragged at lesser distances than conventional turbines having multiple blades with considerably lower pitch-to-diameter ratios. For example, in one embodiment, the turbine blade 300 may be towed at a velocity of between about 0.5 knots (0.26 m/s) to about 6 knots (3.1 m/s). For example, the turbine blade 300 may be towed at a velocity of about 1 knot (0.51 m/s), about 1.5 knots (0.77 m/s), about 2 knots (1.02 m/s), about 2.5 knots (1.29 m/s), about 3 knots (1.54 m/s), about 3.5 knots (1.8 m/s), about 4 knots (2.06 m/s), about 4.5 knots (2.32 m/s), about 5 knots (2.57 m/s), about 5.5 knots (2.83 m/s), or about 6 knots (3.1 m/s). In one preferred embodiment, the turbine blade 300 is towed in a drogue configuration at a velocity of from about 1 knot (0.26 m/s) to about 2 knots (1.02 m/s). In another preferred embodiment, the turbine blade may be towed behind an aquatic vehicle 350 at a velocity of about 1.5 knots (0.77 m/s).

As shown in Equation 1, above, the velocity at which the turbine blade 300 is towed is an important factor in determining the amount of rotational energy produced. However, at speeds above about 6 knots (3.1 m/s), it is believed that the turbine blade 300 will not catch or cut the water such that the water will effectively roll around the turbine blade rather than through it. This behavior may be due to cavitation, or the formation of voids in the water as a result of sudden pressure changes. This is in contrast to typical propeller-type turbines, which are generally not designed to be efficient at flow velocities below about 3 m/s.

Figure 4:
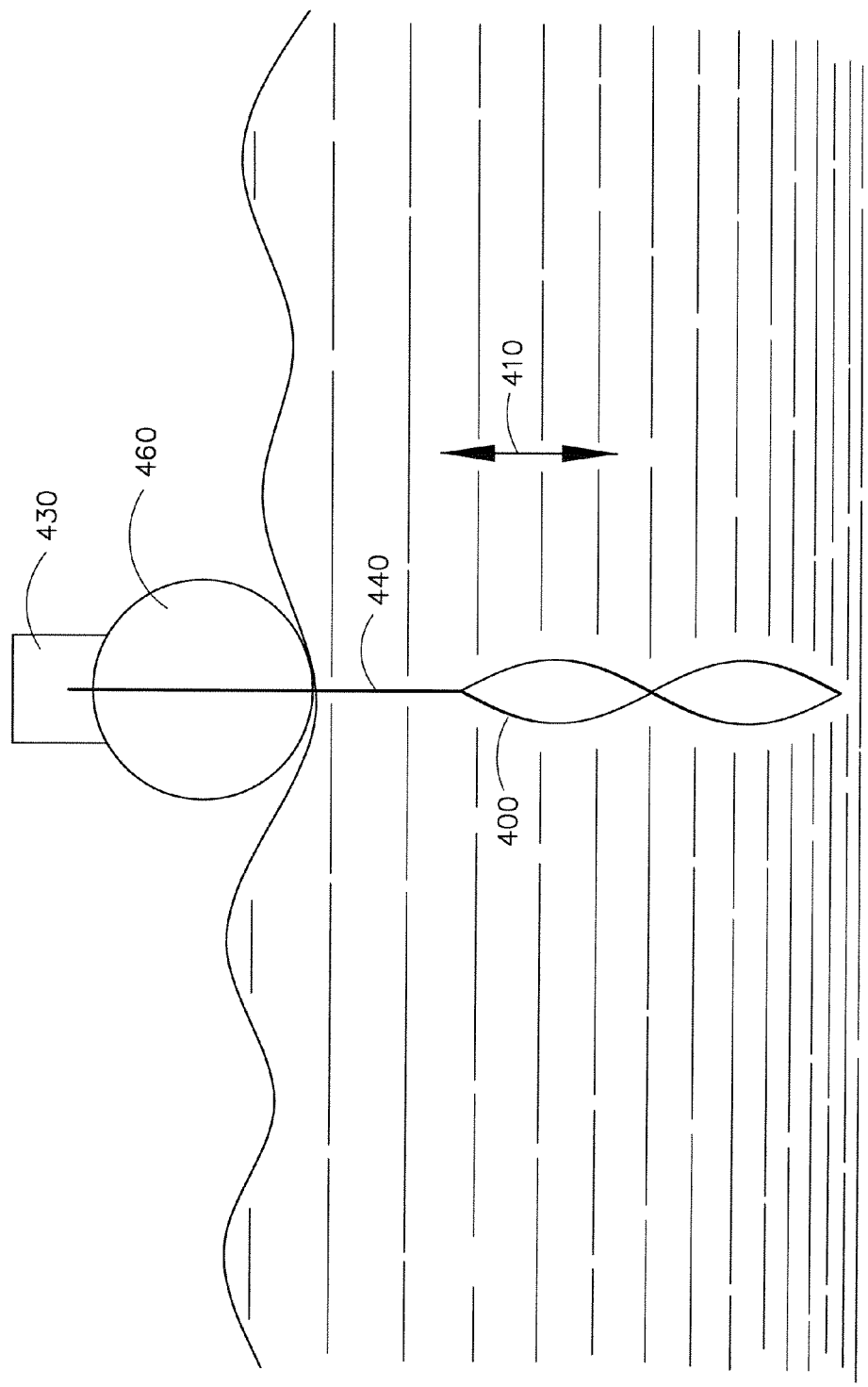
FIG. 4 illustrates a turbine system according to an exemplary embodiment.

Referring to FIG. 4, a turbine blade 400 is illustrated suspended below the surface of a liquid medium such as a river, lake, or ocean, and beneath a floating buoy 460. A generator 430 is located at the buoy 460 and the turbine blade 400 is attached thereto via tethering means 440. According to one embodiment, the direction of rotation of the turbine blade 400 depends only on the rotation of the blade about its central axis. In other words, the turbine blade 400 may be constructed to rotate in the same rotational direction independent of water (or air) flow direction 410. Thus, in some embodiments, the turbine blade 400 may lie in a horizontal direction, vertical direction, or with any inclination in the vertical plane depending on the requirements of the environment. As shown, the turbine blade 400 responds to vertical ocean wave heave 410 by twisting or rotating. In this way, rotational torque is developed between the tethering means 440 and the turbine blade 400. Once developed, the rotational torque may be harnessed to drive a generator 430 or other electricity producing apparatus such as but not limited to an electrical dynamo or hydraulic pump, as described above.

In one embodiment, the turbine blade 400 allows for self-starting and uniform rotation. In another embodiment, the turbine blade 400 is constructed such that is relatively safe for fish and other aquatic life, as the apparatus comprises a single blade and does not include extraneous or fast moving parts on which such animals may get impinged or sliced.

The invention described and claimed herein is not to be limited in scope by the specific embodiments herein disclosed since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All publications cited herein are incorporated by reference in their entirety.

We claim:

1. A single turbine blade adapted to rotate in response to a fluid flow, the single turbine blade comprising of:
    a single, continuous piece of material formed of one of fiber glass or carbon fiber, the single piece of material being formed into a configuration having a first endpoint and a second endpoint located a distance apart on a central axis;
    a first helical edge spiraling in a directional rotation about the central axis from the first endpoint to the second endpoint; and
    a second helical edge spiraling in the directional rotation about the central axis from the first endpoint to the second endpoint, the first helical edge and the second helical edge being equidistant from the central axis and the second helical edge being approximately congruent to the first helical edge and being connected to the first helical edge such that the distance between the first helical edge and second helical edge defines a diameter of the turbine blade, and such that the turbine blade approximates a double helix in shape having a solid cross section and a pitch-to-diameter ratio of from about 1:1 to about 10:1; and
    wherein the single turbine blade is further adapted to rotate in response to a fluid flow having a velocity of less than 3.0 meters per second and is connected to a generator via a tethering means at only one of the first and second endpoints thereof and further wherein the first or second endpoint to which the tethering means is connected is reinforced with a coating of metal, the other of the first and second endpoints remaining untethered.

2. The turbine blade of claim 1, wherein the directional rotation is a right rotation about the central axis.

3. The turbine blade of claim 1, wherein the directional rotation is a left rotation about the central axis.

4. The turbine blade of claim 1, wherein the distance between the first endpoint and second endpoint comprises from about 0.25 meters to about 5 meters.

5. The turbine blade of claim 4, wherein the distance between the first endpoint and second endpoint comprises from about 1.5 meters to about 3 meters.

6. The turbine blade of claim 1, wherein the distance between the first endpoint and second endpoint comprises a length greater than about 5 meters.

7. The turbine blade of claim 1, wherein the pitch-to-diameter ratio is from about 3:1 to about 5:1.

8. The turbine blade of claim 1, wherein the diameter is fixed throughout a majority of the distance between the first endpoint and second endpoint.

9. A system for producing electrical energy from a fluid medium flowing at a velocity in a flow direction, the system comprising:
   a single turbine blade in communication with the flowing fluid medium having a velocity of less than 3.0 meters per second, the single turbine blade adapted to receive energy from the medium and produce mechanical energy therefrom, the single turbine blade comprising of:
   a single, continuous piece of material formed of one of fiber glass or carbon fiber, the single piece of material being formed into a configuration having
   a first endpoint and a second endpoint located a distance apart on a central axis;
   a first helical edge spiraling in a directional rotation about the central axis from the first endpoint to the second endpoint; and
   a second helical edge spiraling in the directional rotation about the central axis from the first endpoint to the second endpoint, the first helical edge and the second helical edge being equidistant from the central axis and the second helical edge being approximately congruent to the first helical edge and being connected to the first helical edge such that the distance between the first helical edge and second helical edge defines a diameter of the turbine blade, and such that the turbine blade approximates a double helix in shape having a solid cross section and a pitch-to-diameter ratio of from about 1:1 to about 10:1; and
   a generator adapted to convert mechanical energy to electrical energy; and
   a tethering means in communication with the turbine blade and the generator, the tethering means adapted to translate mechanical energy from the turbine blade to the generator, wherein the tethering means is in communication with only one of the first and second endpoints of the single turbine blade and further wherein the first or second endpoint to which the tethering means is in communication is reinforced with a coating of metal, the other of the first and second endpoints remaining untethered.

10. The system of claim 9, wherein the directional rotation is either a right rotation about the central axis or a left rotation about the central axis of the turbine blade.

11. The system of claim 9, wherein the distance between the first endpoint and second endpoint of the turbine blade comprises from about 0.25 meters to about 5 meters.

12. The system of claim 11, wherein the distance between the first endpoint and second endpoint of the turbine blade comprises from about 1.5 meters to about 3 meters.

13. The system of claim 9, wherein the distance between the first endpoint and second endpoint of the turbine blade comprises a length greater than about 5 meters.

14. The system of claim 9, wherein the pitch-to-diameter ratio of the turbine blade is from about 3:1 to about 5:1.

15. The system of claim 9, wherein the diameter of the turbine blade is fixed throughout a majority of the distance between the first endpoint and second endpoint.

16. The system of claim 9, wherein the turbine blade has a solid cross section.

17. The system of claim 9, wherein the tethering means is selected from the group consisting of ropes, cables, wires, chains, and rods.

* * * * *